United States Patent
Tsuchiya

(10) Patent No.: US 8,700,927 B2
(45) Date of Patent: Apr. 15, 2014

(54) SEMICONDUCTOR INTEGRATED CIRCUIT, INTERCONNECT, AND COMPUTER READABLE MEDIUM STORING MEDIUM STORING CONTROL PROGRAM

(75) Inventor: Takehiko Tsuchiya, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 13/015,703

(22) Filed: Jan. 28, 2011

(65) Prior Publication Data

US 2012/0066521 A1 Mar. 15, 2012

(30) Foreign Application Priority Data

Sep. 13, 2010 (JP) ................................. 2010-204505

(51) Int. Cl.
*G06F 1/00* (2006.01)
(52) U.S. Cl.
USPC .......................................... 713/300; 713/322
(58) Field of Classification Search
USPC .......................... 710/300–340, 600, 500, 110; 713/300–340, 600, 500
See application file for complete search history.

(56) References Cited

U.S. PATENT DOCUMENTS

| | | | |
|---|---|---|---|
| 7,437,582 B1 | 10/2008 | Parlour | |
| 7,698,514 B2 | 4/2010 | Kulkarni et al. | |
| 8,183,899 B2 | 5/2012 | Kanno et al. | |
| 8,332,666 B2 * | 12/2012 | Boss et al. | 713/300 |
| 8,350,595 B2 | 1/2013 | Kanno et al. | |
| 2008/0307042 A1 | 12/2008 | Honda et al. | |
| 2009/0172226 A1 | 7/2009 | Kulkarni et al. | |
| 2010/0117697 A1 | 5/2010 | Kanno et al. | |
| 2010/0169682 A1 * | 7/2010 | Umezawa | 713/320 |
| 2010/0241885 A1 * | 9/2010 | He et al. | 713/322 |
| 2012/0187993 A1 | 7/2012 | Kanno et al. | |

FOREIGN PATENT DOCUMENTS

| | | | |
|---|---|---|---|
| JP | 08-190535 | * | 7/1996 |
| JP | 08-190535 A | | 7/1996 |
| JP | 10-187300 | * | 7/1998 |
| JP | 2004-064340 A | | 2/2004 |
| JP | 2008-026948 | | 2/2008 |
| JP | 2008-026948 | * | 7/2008 |

OTHER PUBLICATIONS

Japanese Office Action dated Feb. 8, 2013 for Japanese Patent Application No. 2010-204505, 8 pages.
Japanese Office Action issued on Jun. 18, 2013 in corresponding JP Application No. 2010-204505 along with English translation.
Japanese Office Action issued on Jun. 8, 2013 in corresponding JP Application No. 2010-204505 along with English translation.

* cited by examiner

Primary Examiner — Faisal M Zaman
Assistant Examiner — Kim Huynh
(74) Attorney, Agent, or Firm — White & Case LLP

(57) ABSTRACT

A semiconductor integrated circuit includes an adjuster and a controller. The adjuster adjusts transmission and reception of data by temporarily holding the data transmitted and received among a plurality of devices and output location information on the data. The controller controls power consumption of at least one of target devices based on a change amount of the location information.

11 Claims, 16 Drawing Sheets

SEMICONDUCTOR INTEGRATED CIRCUIT, INTERCONNECT, AND COMPUTER READABLE MEDIUM STORING MEDIUM STORING CONTROL PROGRAM

CROSS REFERENCE TO RELATED APPLICATIONS

This application is based upon and claims the benefit of priority from the prior Japanese Patent Application No. 2010-204505, filed on Sep. 13, 2010, the entire contents of which are incorporated herein by reference.

FIELD

Embodiments described herein relate generally to a semiconductor integrated circuit, an interconnect and a computer readable medium storing control program.

BACKGROUND

Recently, a demand for reducing power consumption of a semiconductor integrated circuit is increased, more specifically, in the following case.

For example, a plurality of chips is stacked in order to enlarge the semiconductor integrated circuit. In this case, heat between the chips is hardly dissipated. However, if a sufficient radiator such as a heat sink is attached in order to dissipate the heat between the chips, the semiconductor integrated circuit can be thin. Accordingly, reduction of the power consumption (particularly, peak power) of the semiconductor integrated circuit is required when the chips are stacked.

There is well known a technology called Dynamic Voltage and Frequency Scaling (hereinafter referred to as "DVFS"). In the DVFS, a power consumed in operating the semiconductor integrated circuit is reduced by operating the semiconductor integrated circuit at the minimum voltage and frequency.

However, the conventional control circuit (hereinafter referred to as "VFC (Voltage Frequency Controller)") that realizes the DVFS is individually developed in each application. Therefore, the conventional VFCs does not have versatility and high reusability.

DETAILED DESCRIPTION

Embodiments will now be explained with reference to the accompanying drawings.

In general, according to one embodiment, a semiconductor integrated circuit includes an adjuster and a controller. The adjuster adjusts transmission and reception of data by temporarily holding the data transmitted and received among a plurality of devices and output location information on the data. The controller controls power consumption of at least one of target devices based on a change amount of the location information.

Figure 1:
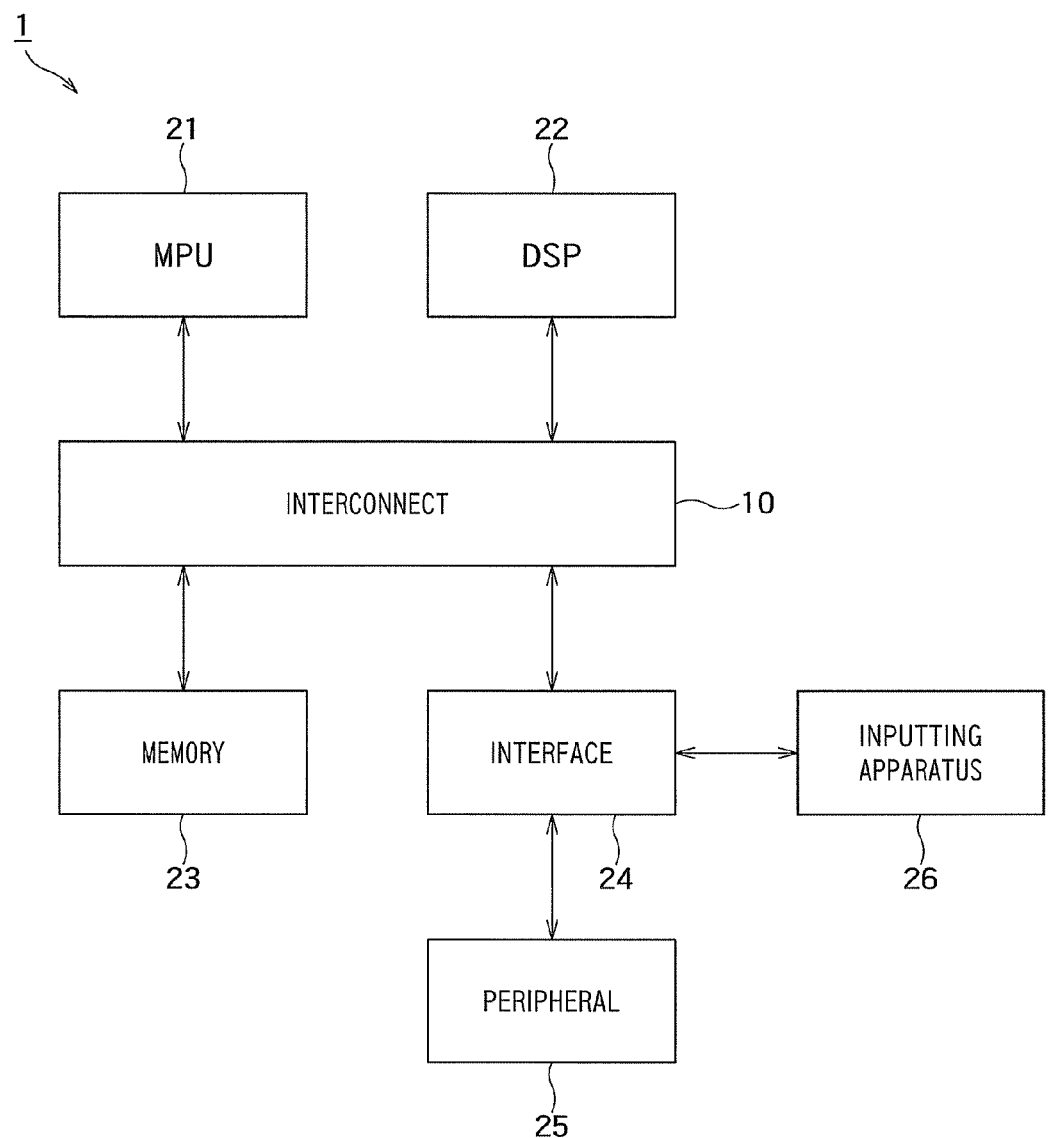
FIG. 1 is a block diagram illustrating a configuration of the semiconductor integrated circuit of the embodiment.

A semiconductor integrated circuit of the embodiment will be explained below. FIG. 1 is a block diagram illustrating a configuration of the semiconductor integrated circuit of the embodiment.

Referring to FIG. 1, a semiconductor integrated circuit 1 includes an interconnect 10, an MPU (Micro Processing Unit) 21, a DSP (Digital Signal Processor) 22, a memory 23, an interface 24, a peripheral 25, and an inputting apparatus 26.

The interconnect 10 is a module that controls data transmission and reception among the MPU 21, the DSP 22, the memory 23, and the peripheral 25. The MPU 21 and the DSP are processors that perform pieces of predetermined processing. The memory 23 is a module in which pieces of data necessary for processing performed by the MPU 21, the DSP 22, and the peripheral 25 are stored. The interface 24 is a module that controls data transmission and reception among the interconnect 10, the peripheral 25 and inputting apparatus 26. The peripheral 25 is a device that transmits and receives the data among the MPU 21, the DSP 22, and the memory 23. The inputting apparatus 26 receives inputs of parameters (a first threshold TH1 to a fourth threshold TH4 and a threshold voltage VTH) necessary for the DVFS and operation modes (a low power consumption mode LP and a high speed mode HS). When the low power consumption mode LP is set, power consumption is prior to an operating speed. When the high speed mode HS is set, the operating speed is prior to the power consumption. Each of the DSP 22, the memory 23, and the interface 24 includes a regulator and a clock gear. The interface 24 can be connected to various devices through a network.

Figure 2:
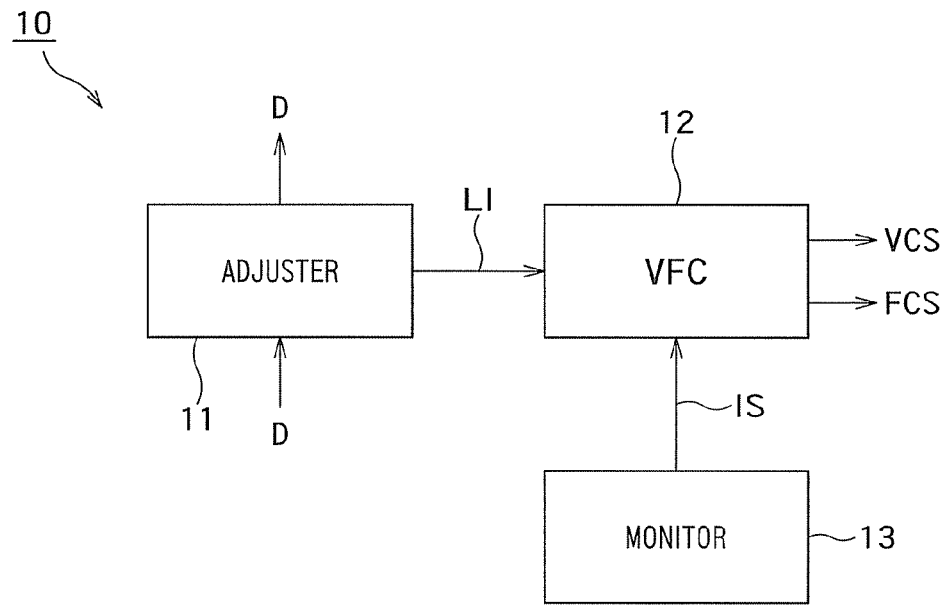
FIG. 2 is a block diagram illustrating a configuration of the interconnect 10 of FIG. 1.

The interconnect of the embodiment will be explained below. FIG. 2 is a block diagram illustrating a configuration of the interconnect 10 of FIG. 1.

The interconnect 10 includes an adjuster 11, a VFC 12, and a monitor 13.

The adjuster 11 is a module that adjusts transmission and reception of data D by temporarily holding the data D transmitted and received among plural devices (the MPU 21, DSP 22, memory 23, and peripheral 25 of FIG. 1). The adjuster 11 receives the data D transmitted from the MPU 21, DSP 22, memory 23, and peripheral 25, temporarily holds the received data D, and transmits the held data D to the MPU 21, DSP 22, memory 23, and peripheral 25. The adjuster 11 acts as a slave device when the data D is received and acts as a master device when the data D is transmitted. That is, the MPU 21, the DSP 22, the memory 23, and the peripheral 25 act as the master device when the adjuster 11 receives the data D, and the MPU 21, the DSP 22, the memory 23, and the peripheral 25 act as the slave device when the adjuster 11 transmits the data D. The adjuster 11 outputs location information LI on the data D when the data D is held. The location information LI indicates a location of the data D in the adjuster 11 and changes according to a state of the transmission and reception of the data D. For example, the adjuster 11 is an FIFO (First In First Out) memory or a memory such as a register map. For example, the location information LI is an index value in the case of the FIFO memory is an address in the case of the memory.

The VFC 12 is a module that controls power consumption of a target device by performing the DVFS based on the output (the location information LI) of the adjuster 11. The VFC 12 performs the DVFS to generate a voltage control signal VCS and a frequency control signal FCS. Then, the VFC 12 outputs the generated voltage control signal VCS and frequency control signal FCS to a target device which that becomes a target of the data transmission and reception. The target device is the MPU 21, the DSP 22, the memory 23, and the peripheral 25 of FIG. 1. For example, the VFC 12 generates the voltage control signal VCS and the frequency control signal FCS according to TABLE 1. The VFC 12 may be provided in any place (for example, an outside of the interconnect 10) in the semiconductor integrated circuit 1. The VFC 12 may be implemented by software (for example, the MPU 21 that executes a control program).

TABLE 1

| Voltage [V] | Frequency [MHz] |
|---|---|
| 1.5 | 500 |
| 1.0 | 100 |
| 0.9 | 50 |
| 0 | 0 |

The monitor 13 is a module that monitors an operating environment of the target device. When the operating environment is abnormal, the monitor 13 generates an interrupt signal IS and outputs the generated interrupt signal IS to the VFC 12. For example, the operating environment is an operating temperature or an operating current of the target device. The monitor 13 generates the interrupt signal IS when the operating temperature or operating current of the target device is more than a predetermined value.

First Embodiment

A first embodiment will be explained below. In the first embodiment, the DVFS is explained by way of example when the target device is the slave device.

Figure 3:
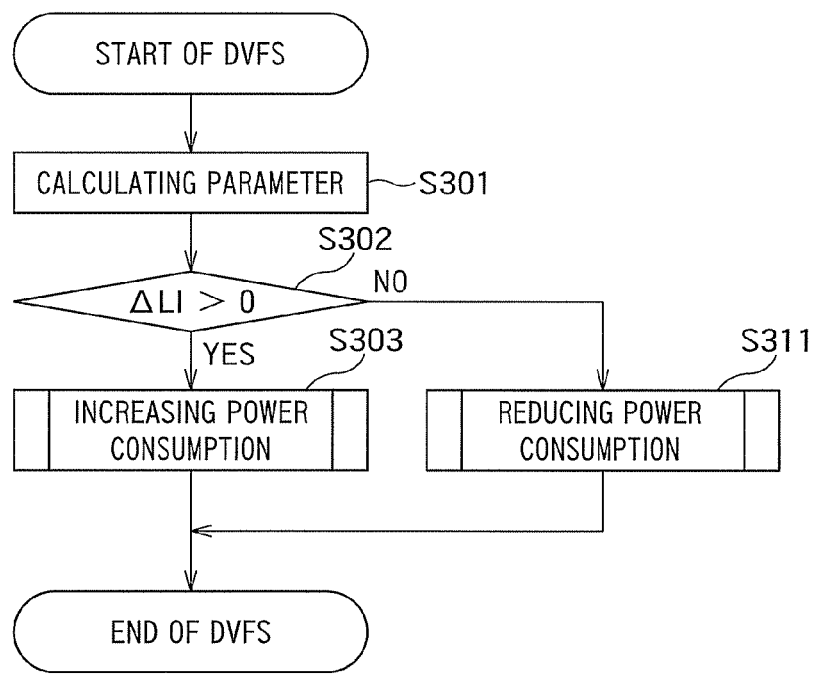
FIG. 3 is a flowchart illustrating a procedure of the DVFS of the first embodiment.

The DVFS of the first embodiment will be explained. FIG. 3 is a flowchart illustrating a procedure of the DVFS of the first embodiment.

<Calculating parameter (S301)> The VFC 12 calculates the parameters necessary for the DVFS. In the calculating parameter (S301), the VFC 12 is acts as a parameter calculator. Specifically, the VFC 12 monitors the output (location information LI) of the adjuster 11. When the location information LI changes, the VFC 12 calculates a change amount (hereinafter referred to as "location information change amount $\Delta LI$") of the location information LI, a first cycle number C1 indicating a time required until the location information LI changes, a second cycle number C2 indicating a time during which the location information LI is maintained, and a third cycle number C3 indicating a time during which the location information LI is not increased (that is, is maintained or reduced). That is, the first cycle number C1 to the third cycle number C3 are parameters relating to the change of the location information LI.

<S302> The VFC 12 determines whether the location information change amount $\Delta LI$ calculated in the calculating parameter (S301) is more than 0. The location information change amount $\Delta LI$ more than 0 means that it is necessary to increase a voltage and a frequency of the target device. When the location information change amount $\Delta LI$ is more than 0 (YES in S302), increasing power consumption (S303) is performed. When the location information change amount $\Delta LI$ is equal to or lower than 0 (NO in S302), reducing power consumption (S311) is performed.

<Increasing power consumption (S303)> The VFC 12 increases power consumption of the target device under a predetermined condition. In the increasing power consumption (S303), the VFC 12 acts as a power controller. When the increasing power consumption (S303) is ended, the DVFS is ended.

<Reducing power consumption (S311)> The VFC 12 reduces power consumption of the target device under the predetermined condition. In the reducing power consumption (S311), the VFC 12 acts as the power controller. When the reducing power consumption (S311) is ended, the DVFS is ended.

That is, the VFC 12 of FIG. 2 dynamically controls the voltage and frequency of the target device based on the parameters calculated in the calculating parameter (S301) of FIG. 3.

Figure 4:
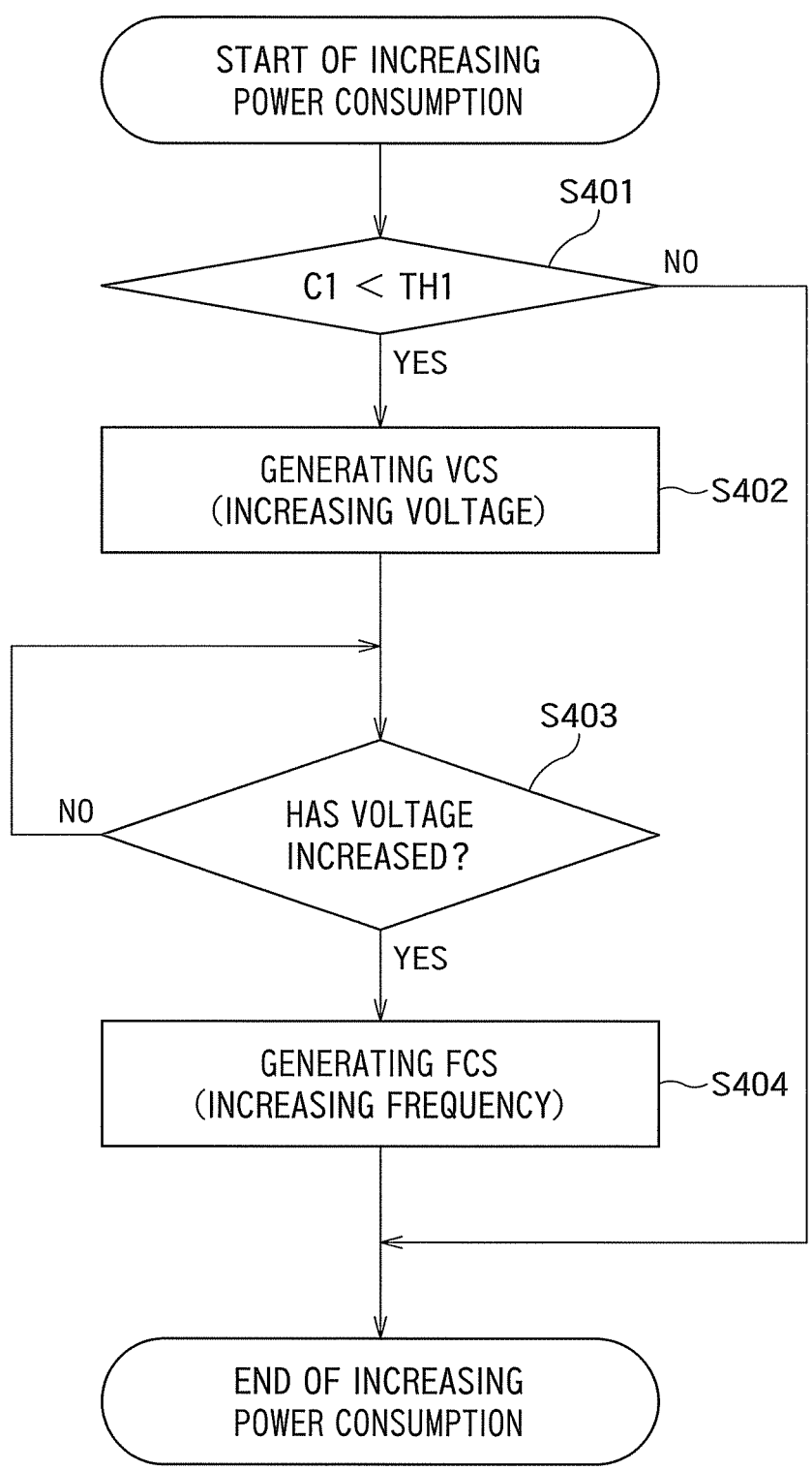
FIG. 4 is a flowchart illustrating a procedure of the increasing power consumption (S303) of FIG. 3.
Figure 5:
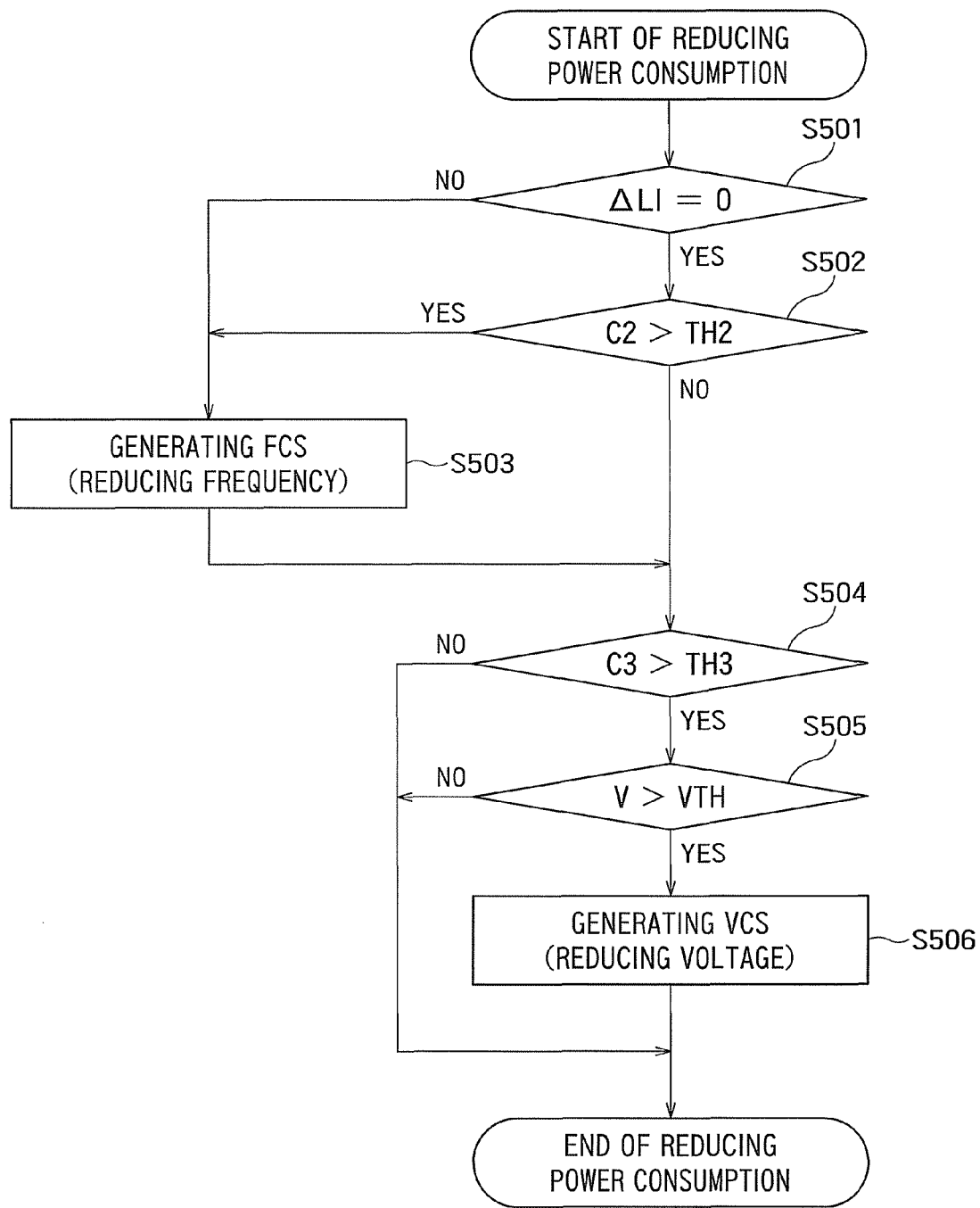
FIG. 5 is a flowchart illustrating a procedure of the reducing power consumption (S311) of FIG. 3.

The increasing power consumption and reducing power consumption of the first embodiment will be explained below. FIG. 4 is a flowchart illustrating a procedure of the increasing power consumption (S303) of FIG. 3. FIG. 5 is a flowchart illustrating a procedure of the reducing power consumption (S311) of FIG. 3.

FIG. 4 illustrates the increasing power consumption when the low power consumption mode LP is set.

<S401> The VFC 12 determines whether the first cycle number C1 is lower than the predetermined first threshold TH1. The first cycle number C1 lower than the first threshold TH1 means that the location information LI changes in a short period of time. When the first cycle number C1 is lower than the predetermined first threshold TH1 (YES in S401), generating VCS (increasing voltage) (S402) is performed. When the first cycle number C1 is not lower than the first threshold TH1 (NO in S401), the increasing power consumption is ended.

<Generating VCS (increasing voltage) (S402)> The VFC 12 generates the control signal VCS in order to increase the voltage at the target device. Then, the VFC 12 outputs the generated control signal VCS to the target device, thereby increasing the voltage at the target device. In the generating VCS (increasing voltage) (S402), the VFC 12 acts as a voltage controller.

<S403> The VFC 12 determines whether the increasing voltage at the target device by the control signal VCS generated in the generating VCS (increasing voltage) (S402) is ended (whether the voltage at the target device becomes constant). When the voltage at the target device has increased (YES in S403), generating FCS (increasing frequency) (S404) is performed. When the voltage at the target device is increasing (NO in S403), the VFC 12 waits until the voltage at the target device has increased.

<Generating FCS (increasing frequency) (S404)> The VFC 12 generates the control signal FCS in order to increase the frequency of the target device. Then, the VFC 12 outputs the generated control signal FCS to the target device, thereby increasing the frequency of the target device. In the generating FCS (increasing frequency) (S404), the VFC 12 acts as a frequency controller. When the generating FCS (increasing frequency) (S404) is ended, the increasing power consumption is ended.

The reducing power consumption of FIG. 5 is the reducing power consumption when the low power consumption mode LP is set.

<S501> The VFC 12 determines whether location information change amount ΔLI is 0. When the location information change amount ΔLI is 0 (YES in S501), 5502 is performed. When the location information change amount ΔLI is lower than 0 (NO in S501), generating FCS (reducing frequency) (S503) is performed.

<S502> The VFC 12 determines whether the second cycle number C2 is more than the second threshold TH2. The second cycle number C2 more than the second threshold TN2 means that the location information LI does not change for at least a predetermined period. When the second cycle number C2 is more than the second threshold TH2 (YES in S502), the generating FCS (reducing frequency) (S503) is performed. When the second cycle number C2 is equal to or lower than the second threshold TH2 (S502—NO), S504 is performed.

<Generating FCS (reducing frequency) (S503)> The VFC 12 generates the control signal FCS in order to reduce the frequency of the target device. Then, the VFC 12 outputs the generated control signal FCS to the target device, thereby reducing the frequency of the target device. In the generating FCS (reducing frequency) (S503), the VFC 12 acts as the frequency controller.

<S504> The VFC 12 determines whether the third cycle number C3 is more than the third threshold TH3. The third cycle number C3 more than the third threshold TH3 means that the location information LI is not continuously increased in at least a predetermined period. When the third cycle number C3 is more than the third threshold TH3 (YES in S504), S505 is performed. When the third cycle number C3 is equal to or lower than the third threshold TH3 (NO in S504), the reducing power consumption is ended.

<S505> The VFC 12 determines whether a voltage V at the target device is more than the threshold voltage VTH. The voltage V more than the threshold voltage VTH means that it is necessary to reduce the voltage at the target device. When the voltage V at the target device is more than the threshold voltage VTH (YES in S505), generating VCS (reducing frequency) (S506) is performed. When the voltage V at the target device is equal to or lower than the threshold voltage VTH (NO in S505), the reducing power consumption is ended.

<Generating VCS (reducing voltage) (S506)> The VFC 12 generates the control signal VCS in order to reduce the voltage at the target device. Then, the VFC 12 outputs the generated control signal VCS to the target device, thereby reducing the voltage at the target device. In the generating VCS (reducing voltage) (S506), the VFC 12 acts as the voltage controller. When the generating VCS (reducing voltage) (S506) is ended, the reducing power consumption is ended.

A specific example of the DVFS of the first embodiment will be explained below. FIGS. 6 to 9 are schematic diagrams illustrating transitions in voltage and frequency in the increasing power consumption (S303) and the reducing power consumption (S311) of FIG. 3.

Figure 6:
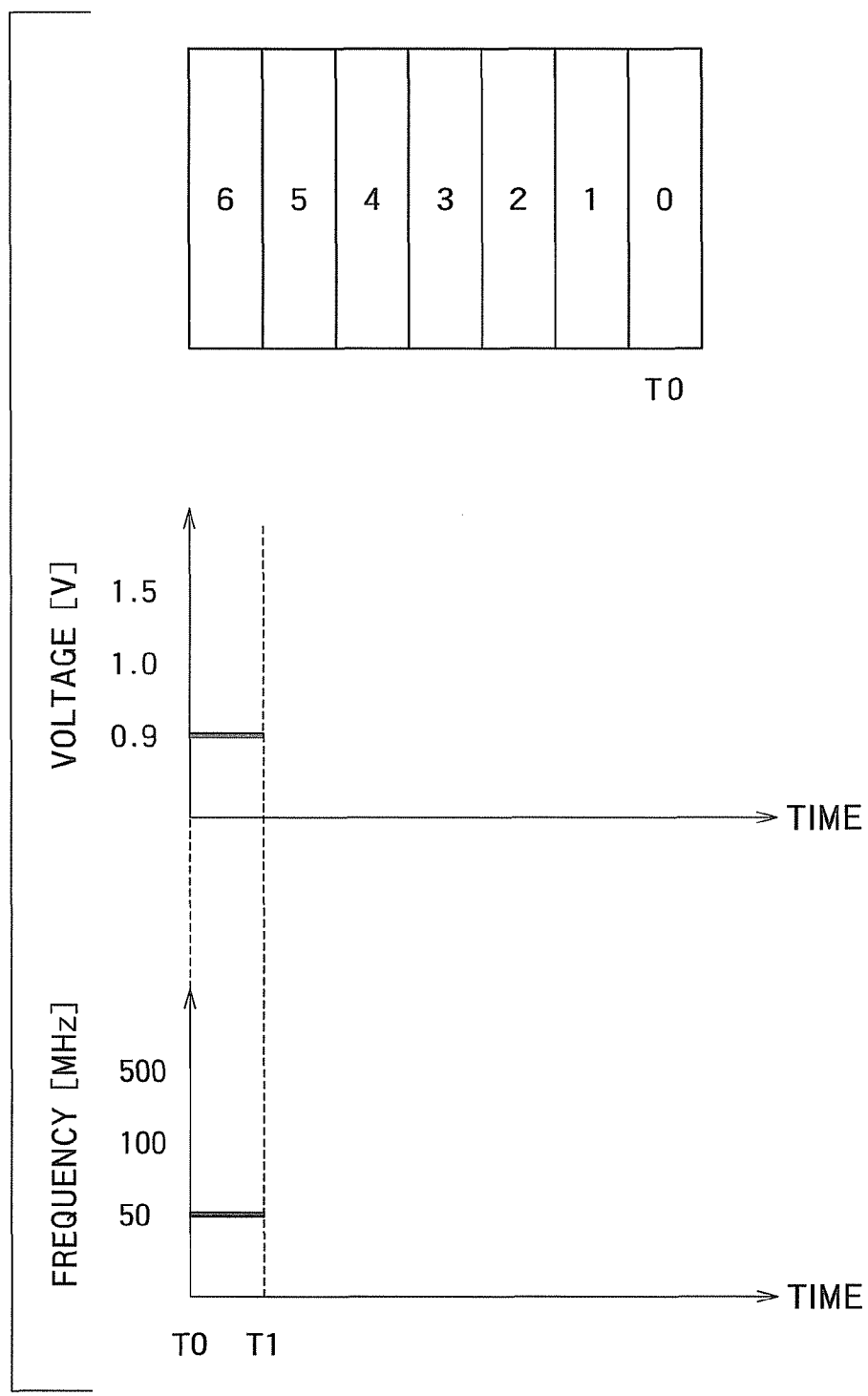
FIGS. 6-9 illustrate states in a period of T0 to T7.

FIG. 6 illustrates a state in a period of T0 to T1. At a time T0, the location information LI has the value of 0, and the target device has the voltage of 0.9 [V] and the frequency of 50 [MHz]. That is, the target device is operated at the minimum voltage and the minimum frequency.

In the period of T0 to T1, the frequency of the target device is maintained at 50 [MHz], and the voltage at the target device is maintained at 0.9 [V].

Figure 7:
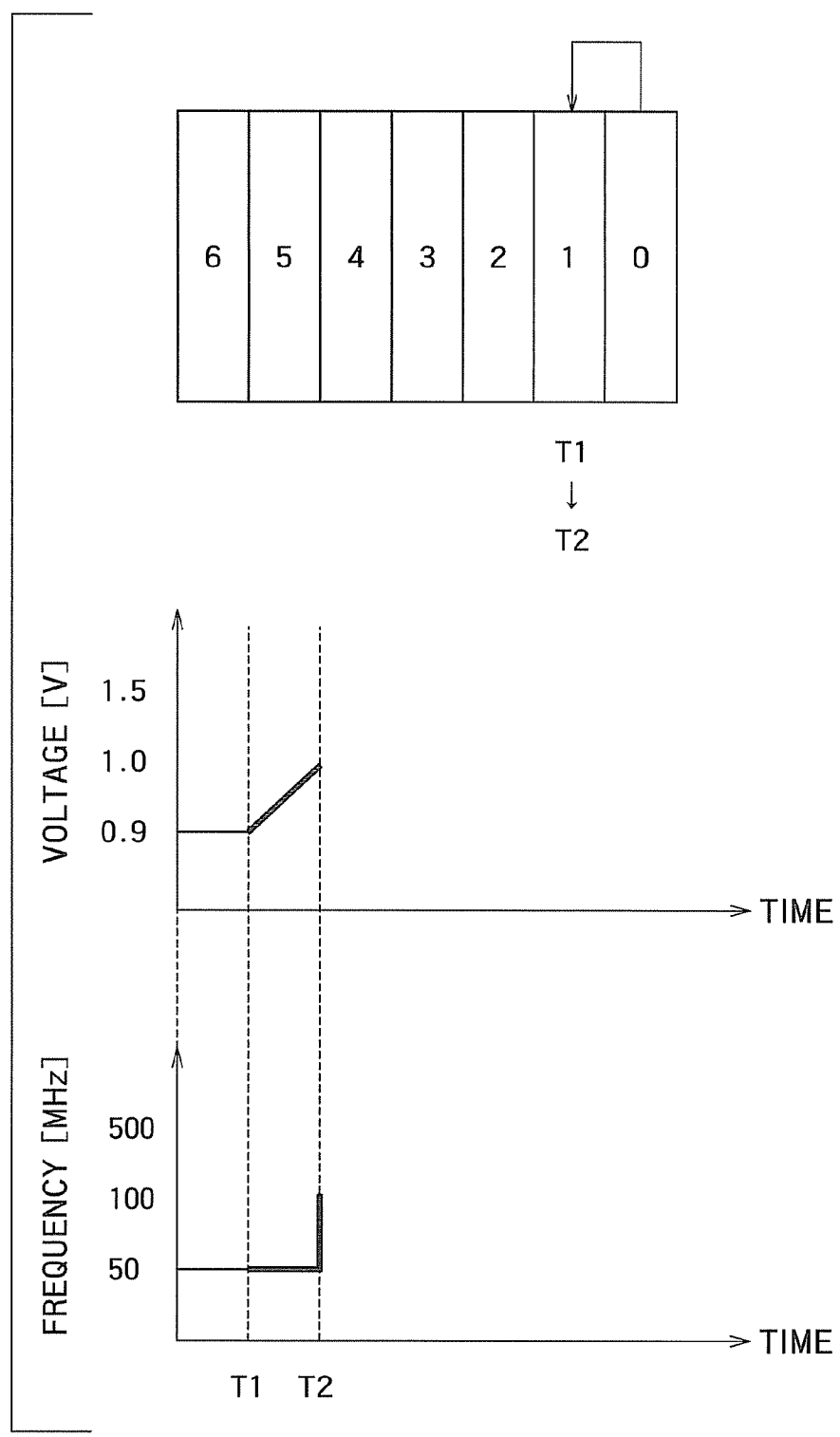

FIG. 7 illustrates a state in a period of T1 to T2. At the time T1, because the value of the location information LI is increased from 0 to 1 (that is, "ΔLI>0") (YES in S302), the increasing power consumption (S303) is performed. In this increasing power consumption (S303), the generating VCS (increasing voltage) (S402) is performed because the first cycle number C1 (=T1−T0) is lower than the first threshold TH1 (YES in S401). Therefore, the increasing voltage at the target device is started.

In the period of T1 to T2, the voltage at the target device is increased, and the frequency of the target device is maintained at 50 [MHz].

At the time T2, when the voltage at the target device has increased (YES in S403), the generating FCS (increasing frequency) (S404) is performed. Therefore, the voltage at the target device reaches 1.0 [V], and the frequency of the target device reaches 100 [MHz].

Figure 8:
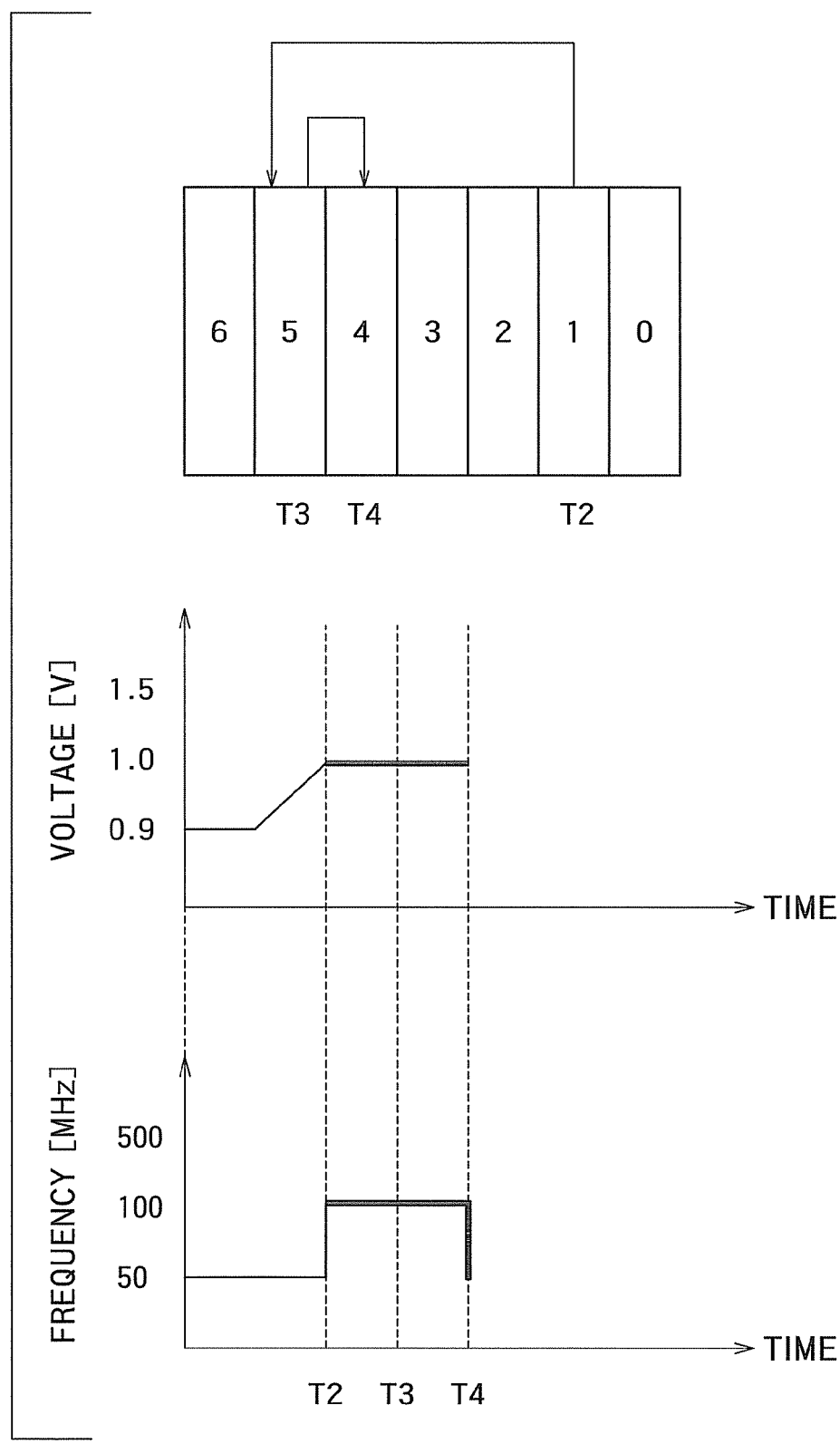

FIG. 8 illustrates a state in a period of T2 to T4. In the period of T2 to T3, the increasing power consumption (S303) is performed four times because the value of the location information LI is increased from 1 to 5 in each one index (that is, "ΔLI>0") (YES in S302). In each increasing power consumption (S303), the generating VCS (increasing voltage) (S402) and the generating FCS (increasing frequency) (S404) is not performed because the first cycle number C1 is not lower than the first threshold TH1 (NO in S401). As a result, the voltage at the target device is maintained at 1.0 [V], and the frequency of the target device is maintained at 100 [MHz].

In the period of T3 to T4, the voltage at the target device is maintained at 1.0 [V], and the frequency of the target device is maintained at 100 [MHz].

At the time T4 of FIG. 8, the reducing power consumption (S311) is performed because the value of the location information LI is reduced from 5 to 4 (that is, "ΔLI<0") (NO in S302). In this reducing power consumption (S311), the generating FCS (reducing frequency) (S503) is performed because of "ΔLI<0" (NO in S501). Therefore, the frequency of the target device reaches 50 [MHz]. Further, in this reducing power consumption (S311), the generating VCS (reducing voltage) (S506) is not performed because the third cycle number C3 (=T4−T3) is equal to or lower than the third threshold TH3 (NO in S504). Therefore, the voltage at the target device is maintained at 1.0 [V].

Figure 9:
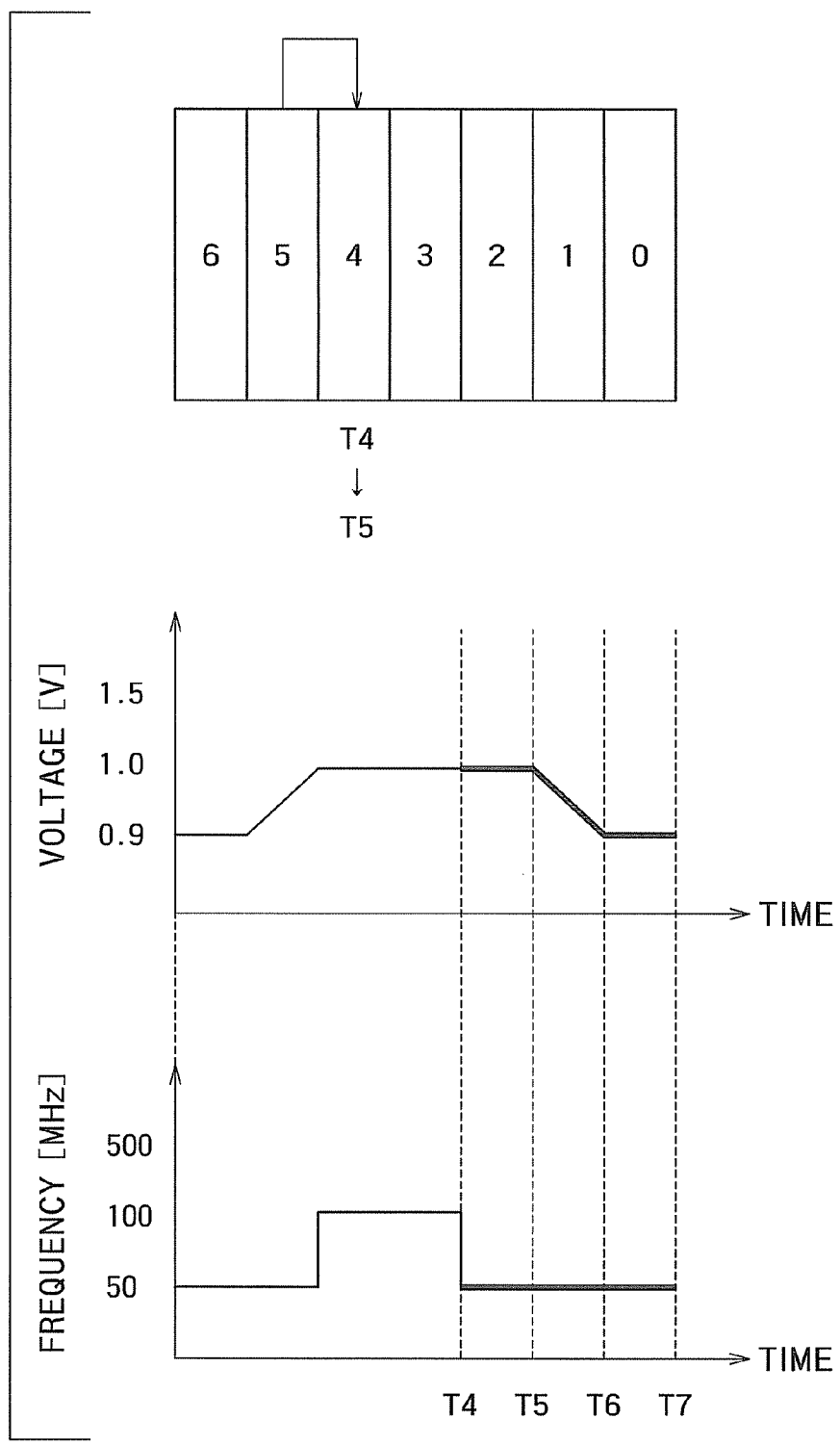

FIG. 9 illustrates a state in a period of T4 to T7. In the period of T4 to T5, the voltage at the target device is maintained at 1.0 [V], and the frequency of the target device is maintained at 50 [MHz].

At the time T5, the reducing power consumption (S311) is performed because the location information LI has the value of 4 (that is, "ΔLI=0") (NO in S302). In this reducing power consumption (S311), the generating FCS (reducing frequency) (S503) is not performed because the location information change amount ΔLI is equal to 0 while the second cycle number C2 (=T5−T4) is equal to or lower than the second threshold (NO in S502). Therefore, the frequency of the target device is maintained at 50 [MHz]. Further, in this reducing power consumption (S311), the generating VCS (reducing voltage) (S506) is performed because the third cycle number C3 (=T5−T3) is more than the third threshold TH3 (YES in S504) while the voltage V (=1.0 [V]) at the target device is more than the threshold voltage VTH (YES in S505). Therefore, the reducing voltage at the target device is started.

In the period of T5 to T6, the voltage at the target device is reduced, and the frequency of the target device is maintained at 50 [MHz].

At the time T6, the voltage at the target device reaches 0.9 [V], and the frequency of the target device is maintained at 50 [MHz].

In the period of T6 to T7, the voltage at the target device is maintained at 0.9 [V], and the frequency of the target device is maintained at 50 [MHz].

For the increasing power consumption in setting the high speed mode HS, S401 is omitted in the increasing power consumption of FIG. 4. That is, in the high speed mode HS, the generating VCS (increasing voltage) (S402) is always performed.

For the reducing power consumption in setting the high speed mode HS, S502 is omitted in the reducing power consumption of FIG. 5. That is, in the high speed mode HS, the generating FCS (reducing frequency) (S503) is performed only when the location information change amount ΔLI is lower than 0.

According to the first embodiment, the semiconductor integrated circuit 1 includes the adjuster 11 and the VFC 12. The adjuster 11 adjusts the data transmission and reception by tentatively holding the data transmitted and received among the plural devices. The VFC 12 controls the power consumption of at least one target device of the plural devices based on the location information LI indicating the location of the data held by the adjuster 11. That is, the VFC 12 calculates the location information change amount ΔLI and the first cycle number C1 to third cycle number C3 relating to the change of the location information, and controls the power consumption of the target device according to the calculation result. As a result, the versatility and reusability of the VFC 12 can be improved.

Second Embodiment

A second embodiment will be explained below. In the second embodiment, the DVFS is described by way of example when the target device is the master device. The descriptions of contents similar to those of the first embodiment will not be repeated.

Figure 10:
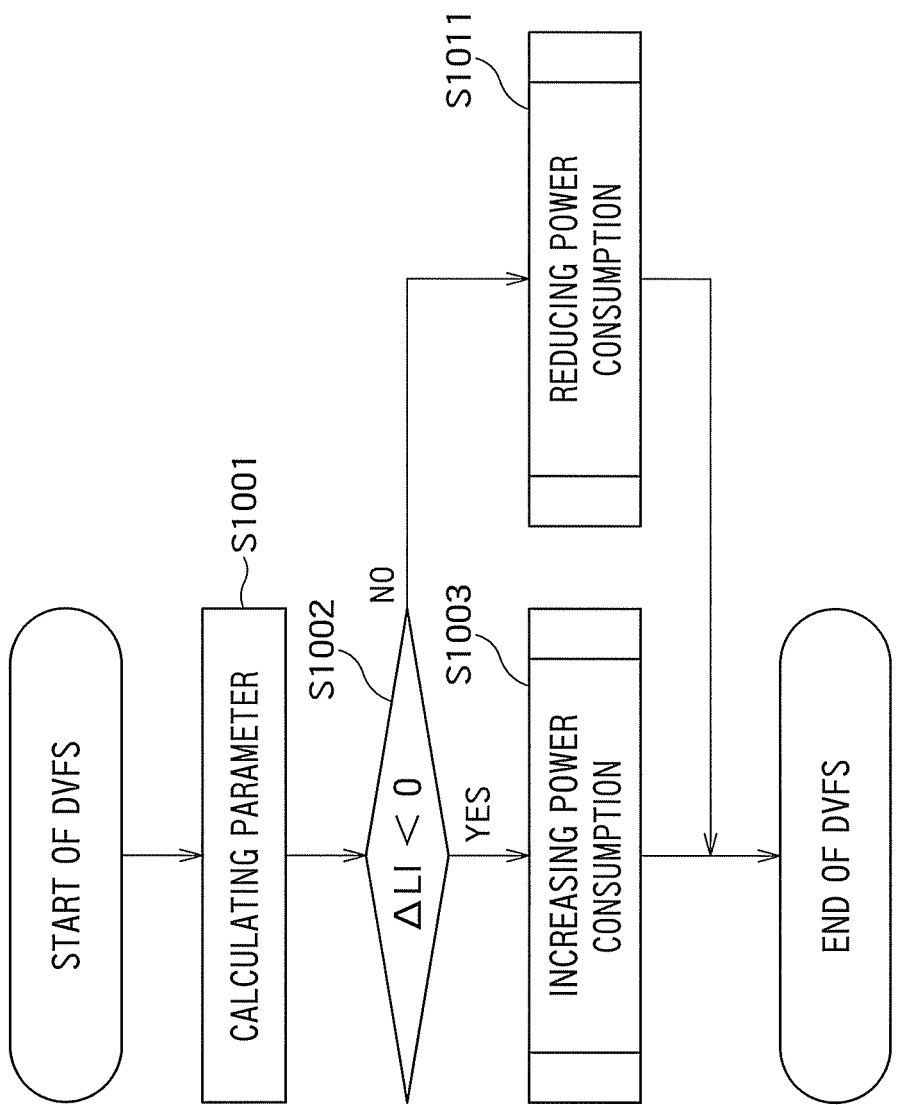
FIG. 10 is a flowchart illustrating a procedure of the DVFS of the second embodiment.

The DVFS of the second embodiment will be explained. FIG. 10 is a flowchart illustrating a procedure of the DVFS of the second embodiment.

<Calculating parameter (S1001)> The VFC 12 calculates the parameters necessary for the DVFS. In the calculating parameter (S1001), the VFC 12 acts as the parameter calculator. Specifically, the VFC 12 monitors the output (location information LI) of the adjuster 11. When the location information LI changes, the VFC 12 calculates the location information change amount ΔLI, the first cycle number C1, the second cycle number C2, and a fourth cycle number C4 indicating a time during which the location information LI is not reduced (that is, is maintained or increased). That is, the first cycle number C1, the second cycle number C2, and the fourth cycle, number C4 are parameters relating to the change of the location information LI.

<S1002> The VFC 12 determines whether the location information change amount ΔLI calculated in the calculating parameter (S1001) is lower than 0. The location information change amount ΔLI lower than 0 means that it is necessary to increase the voltage and frequency of the target device. When the location information change amount ΔLI is lower than 0 (YES in S1002), increasing power consumption (S1003) is performed. When the location information change amount ΔLI is not lower than 0 (NO in S1002), reducing power consumption (S1011) is performed.

<Increasing power consumption (S1003)> The VFC 12 performs the increasing power consumption (S1003) of the target device under a predetermined condition. In the increasing power consumption (S1003), the VFC 12 acts as the power controller. When the increasing power consumption (S1003) is ended, the DVFS is ended.

<Reducing power consumption (S1011)> The VFC 12 performs reducing power consumption (S1011) of the target device under a predetermined condition. In the reducing power consumption (S1011), the VFC 12 acts as the power controller. When the reducing power consumption (S1011), the DVFS is ended.

That is, the VFC 12 of FIG. 2 dynamically controls the voltage and frequency of the target device based on the parameters calculated in the calculating parameter (S1001) of FIG. 10.

Figure 11:
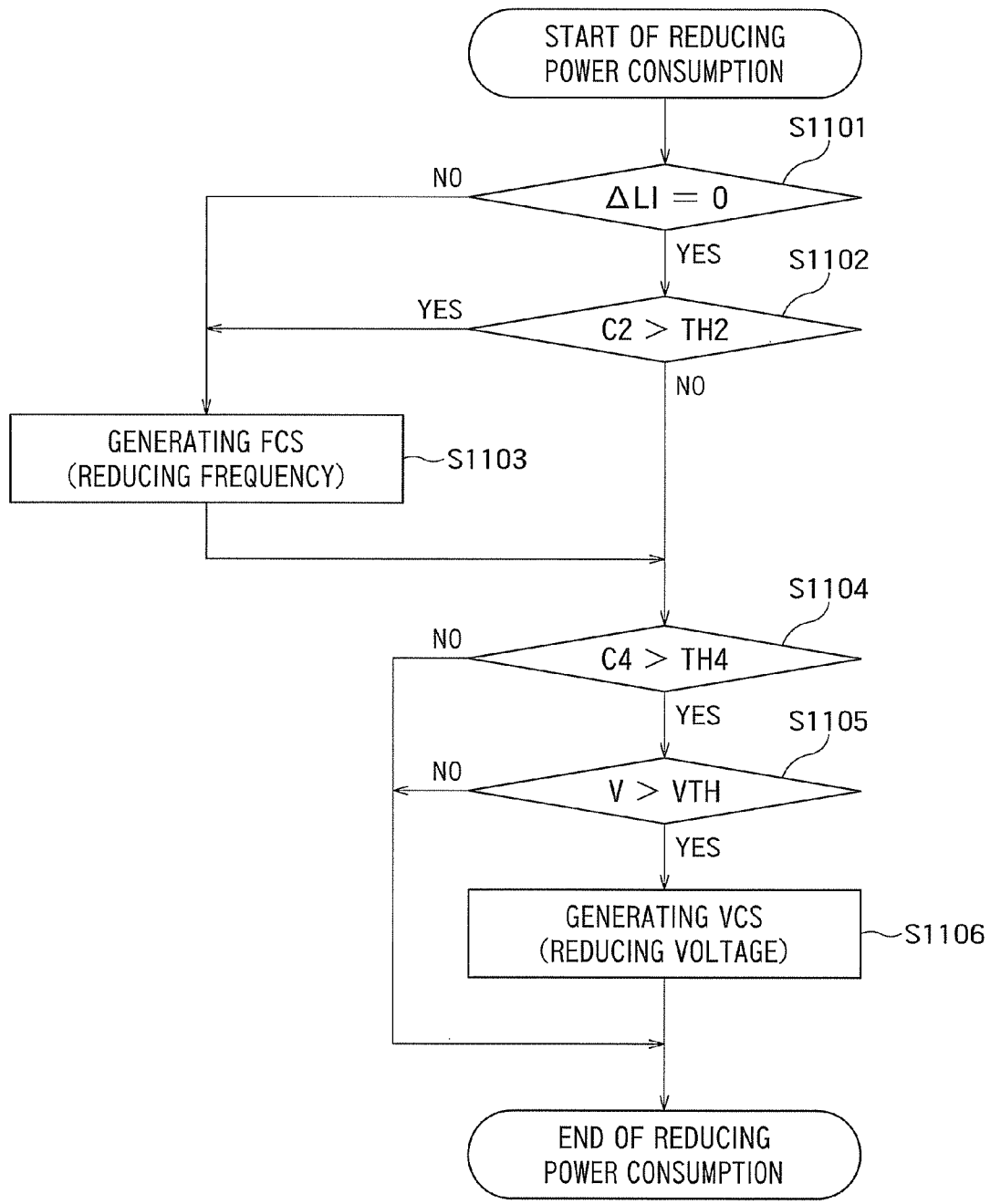
FIG. 11 is a flowchart illustrating a procedure of the reducing power consumption (S1011) of FIG. 10.

The increasing power consumption and reducing power consumption of the second embodiment will be explained below. FIG. 11 is a flowchart illustrating a procedure of the reducing power consumption (S1011) of FIG. 10.

The increasing power consumption (S1003) of FIG. 10 is similar to that (the increasing power consumption (S303) of FIG. 3) of the first embodiment (see FIG. 4).

FIG. 11 illustrates the reducing power consumption when the low power consumption mode LP is set.

<S1101> The VFC 12 determines whether location information change amount ΔLI is 0. When the location information change amount ΔLI is 0 (YES in S1101), S1102 is performed. When the location information change amount ΔLI is more than 0 (NO in S1101), generating FCS (reducing frequency) (S1103) is performed.

<S1102> S1102 is similar to that (S502 of FIG. 5) of the first embodiment.

<Generating FCS (reducing frequency) (S1103)> The generating FCS (reducing frequency) (S1103) is similar to that (the generating FCS (reducing frequency) (S502) of FIG. 5) of the first embodiment.

<S1104> The VFC 12 determines whether the fourth cycle number C4 is more than the fourth threshold TH4. The fourth cycle number C4 more than the fourth threshold TH4 means that the location information LI is not continuously reduced in at least a predetermined period. When the fourth cycle number C4 is more than the fourth threshold TH4 (YES in S1104), S1105 is performed. When the fourth cycle number C4 is equal to or lower than the fourth threshold TH4 (NO in S1104), the reducing power consumption is ended.

<S1105> S1105 is similar to that (S504 of FIG. 5) of the first embodiment.

<Generating VCS (reducing voltage) (S1106)> The generating VCS (reducing voltage) (S1106) is similar to that (generating VCS (reducing voltage) (S506) of FIG. 5) of the first embodiment.

A specific example of the DVFS of the second embodiment will be explained below. FIGS. 12 to 15 are schematic diagrams illustrating transitions in voltage and frequency in the increasing power consumption (S1003) and reducing power consumption (S1011) of FIG. 10.

Figure 12:
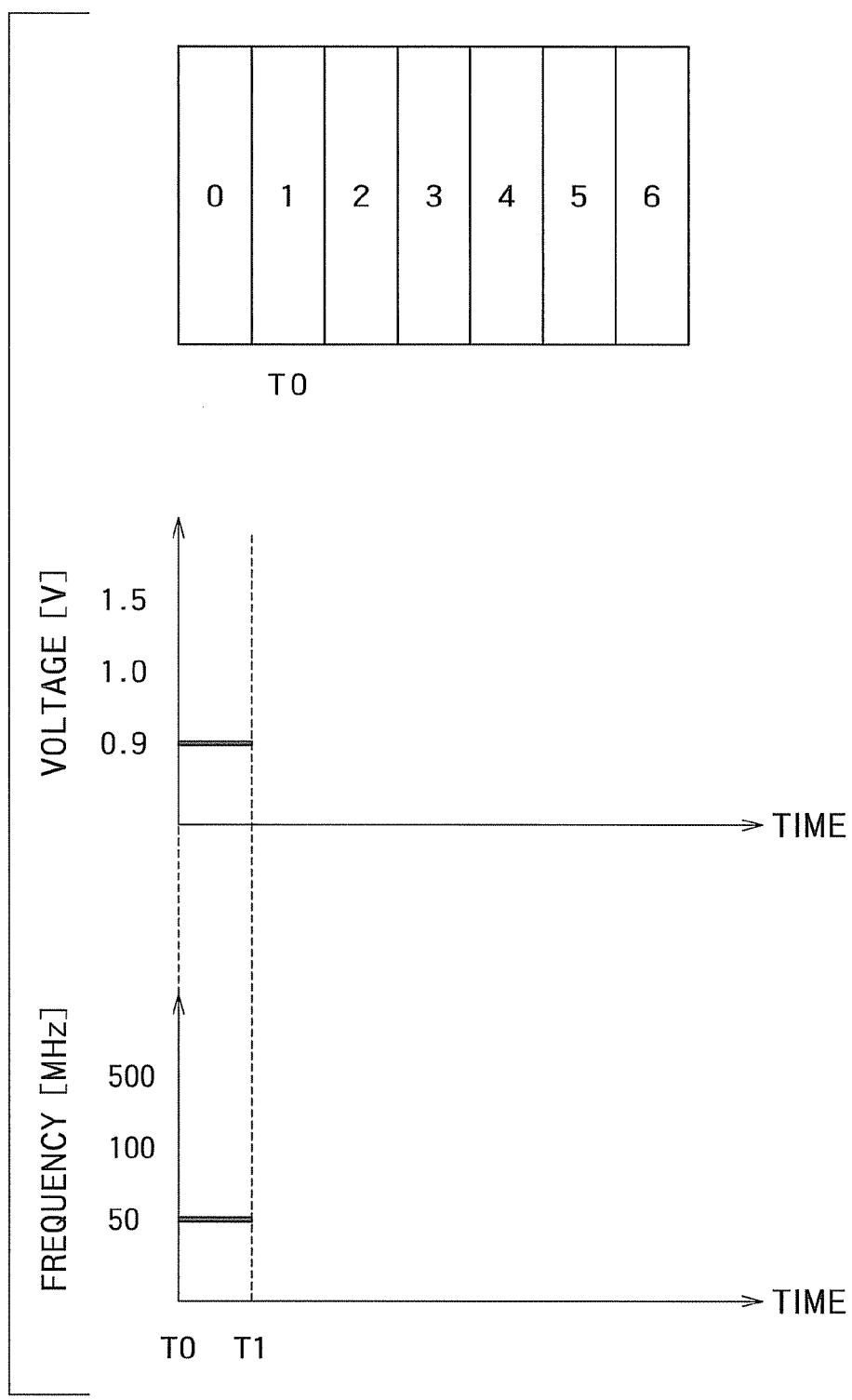
FIGS. 12-15 illustrate states in a period of T0 to T7.

FIG. 12 illustrates a state in a period of T0 to T1. At the time T0, the location information LI has the value of 1, and the target device has the voltage of 0.9 [V] and the frequency of 50 [MHz]. That is, the target device is operated at the minimum voltage and the minimum frequency.

In the period of T0 to T1, the frequency of the target device is maintained at 50 [MHz], and the voltage at the target device is maintained at 0.9 [V].

Figure 13:
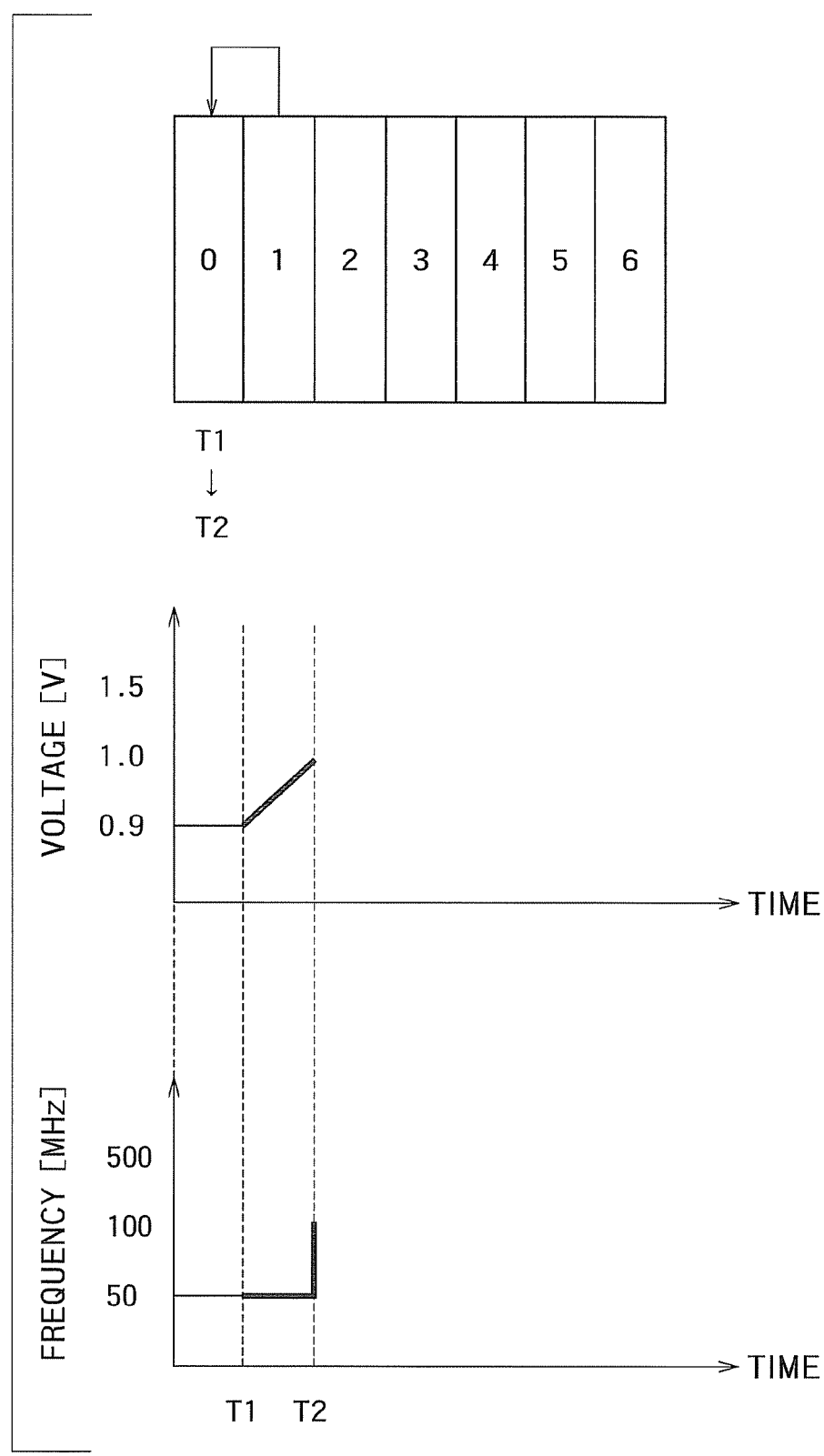

FIG. 13 illustrates a state in a period of T1 to T2. At the time T1, the increasing power consumption (S1003) is performed because the value of the location information LI is reduced from 1 to 0 (that is, "ΔLI<0") (YES in S1002). In this increasing power consumption (S1003), the generating VCS (increasing voltage) (S402) is performed because the first cycle number C1 (=T1−T0) is lower than the first threshold TH1 (YES in S401). Therefore, the increasing voltage at the target device is started.

In the period of T1 to T2, the voltage at the target device is increased, and the frequency of the target device is maintained at 50 [MHz].

At the time T2, the voltage at the target device has increased (YES in S403), the generating FCS (increasing frequency) (S404) is performed. Therefore, the voltage at the target device reaches 1.0 [V], and the frequency of the target device reaches 100 [MHz].

Figure 14:
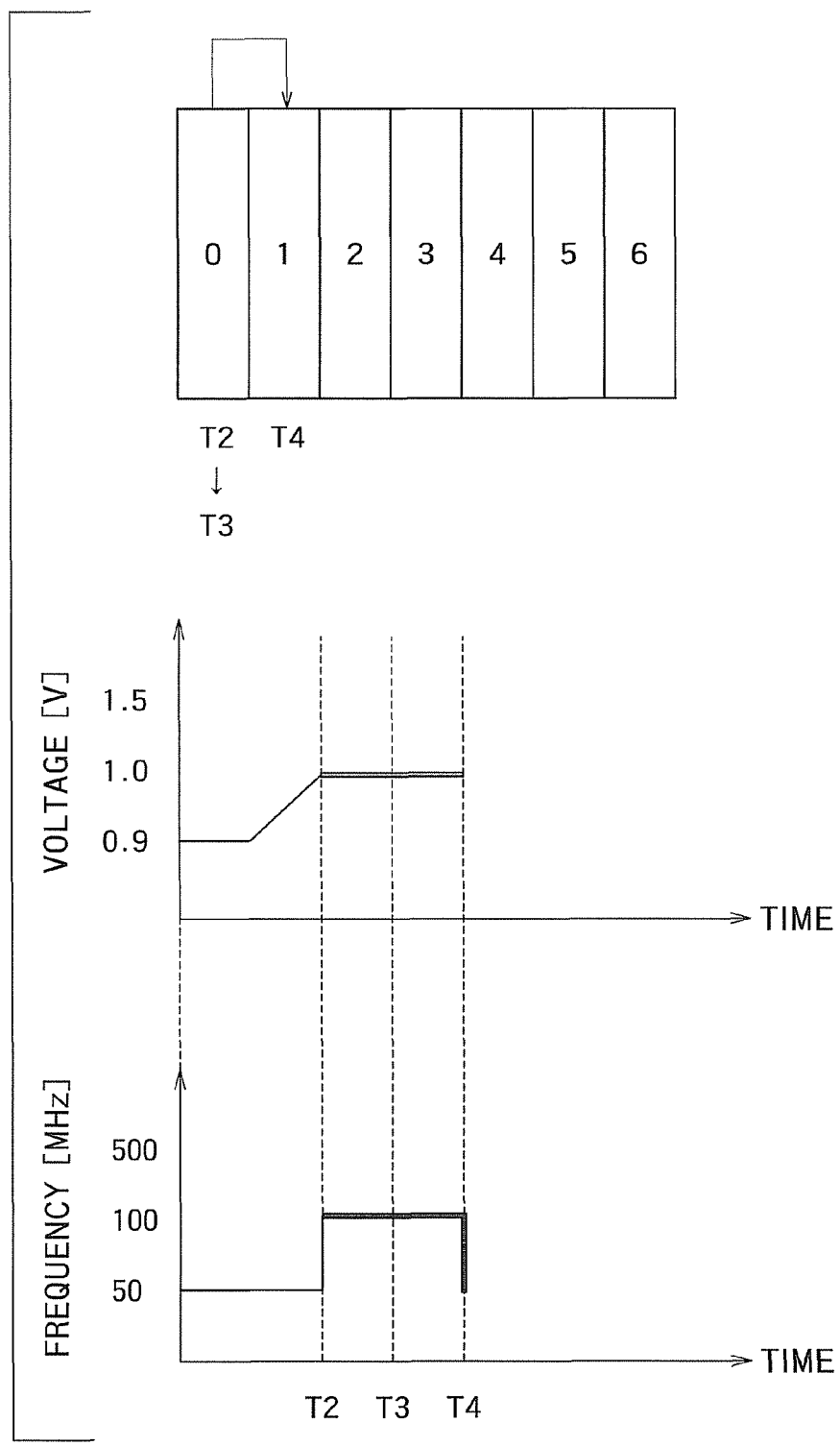

FIG. 14 illustrates a state in a period of T2 to T4. In the period of T2 to T3, the voltage at the target device is maintained at 1.0 [V], and the frequency of the target device is maintained at 100 [MHz].

At the time t3 of FIG. 14, the reducing power consumption (S1011) is performed because the value of the location information LI is maintained at 0 (that is, "$\Delta LI=0$") (NO in S1002). In this reducing power consumption (S1011), the generating VCS (reducing frequency) (S1103) is not performed because the second cycle number C2 (=T3−T2) is equal to or lower than the second threshold TH2 (NO in S1102). Therefore, the frequency of the target device is maintained at 50 [MHz]. Further, in this reducing power consumption (S1011), the generating VCS (reducing voltage) (S1106) is not performed because the fourth cycle number C4 (=T3−T1) is lower than the fourth threshold TH4 (NO in S1104). Therefore, the voltage at the target device is maintained.

In the period of T3 to T4, the voltage at the target device is maintained at 1.0 [V], and the frequency of the target device is maintained at 100 [MHz].

At the time T4, the reducing power consumption (S1011) is performed because the value of the location information LI is increased from 0 to 1 (that is, "$\Delta LI>0$") (NO in S1002). In this reducing power consumption (S1011), the generating FCS (reducing frequency) (S1103) is performed because of "$\Delta LI>0$" (NO in S1101). Therefore, the frequency of the target device reaches 50 [MHz]. Further, in this reducing power consumption (S1011), the generating VCS (reducing voltage) (S1106) is not performed because the fourth cycle number C4 (=T4−T2) is equal to or lower than the fourth threshold TH4 (NO in S1104). Therefore, the voltage at the target device is maintained at 1.0 [V].

Figure 15:
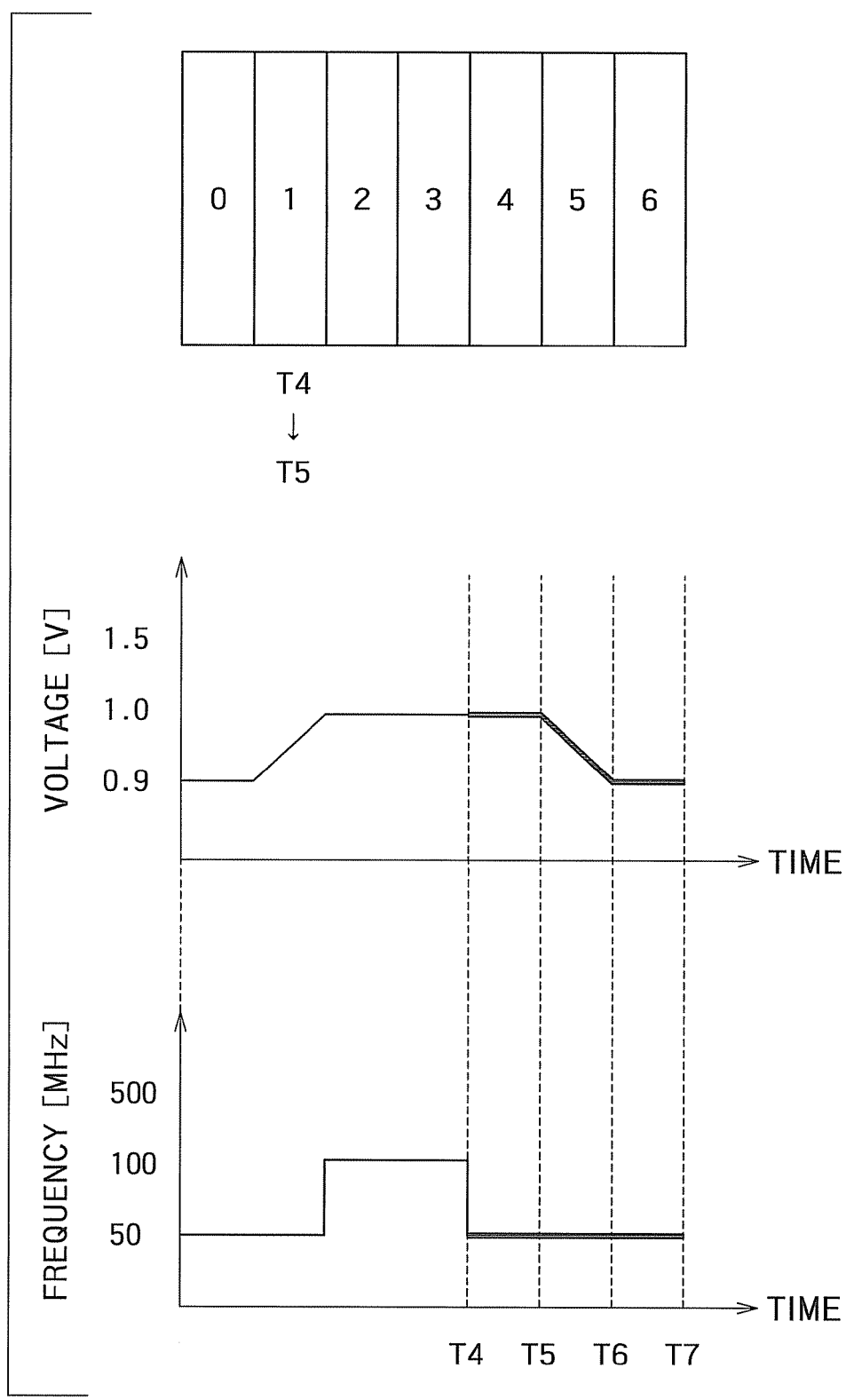

FIG. 15 illustrates a state in a period of T4 to T7. In the period of T4 to T5, the voltage at the target device is maintained at 1.0 [V], and the frequency of the target device is maintained at 50 [MHz].

At the time T5, the reducing power consumption (S1011) is performed because the value of the location information LI is maintained at 1 (that is, "$\Delta LI=0$") (NO in S1002). In this reducing power consumption (S1011), the generating FCS (reducing frequency) (S1103) is not performed because the location information change amount $\Delta LI$ is 0 while the second cycle number C2 (=T5−T4) is equal to or lower than the second threshold (NO in S1102). Therefore, the frequency of the target device is maintained at 50 [MHz]. Further, in this reducing power consumption (S1011), the generating VCS (reducing voltage) (S1106) is performed because the fourth cycle number C4 (=T4−T2) is more than the fourth threshold TH4 (YES in S1104) while the voltage V (=1.0 [V]) at the target device is more than the threshold voltage VTH (YES in S1105). Therefore, the reducing voltage at the target device is started.

In the period of T5 to T6, the voltage at the target device is reduced, and the frequency of the target device is maintained at 50 [MHz].

At the time T6, the voltage at the target device reaches 0.9 [V], and the frequency of the target device is maintained at 50 [MHz].

In the period of T6 to T7, the voltage at the target device is maintained at 0.9 [V], and the frequency of the target device is maintained at 50 [MHz].

For the increasing power consumption in setting the high speed mode HS, S402 is omitted in the increasing power consumption of FIG. 4. That is, in the high speed mode HS, the generating VCS (increasing voltage) (S402) is always performed.

For the reducing power consumption in setting the high speed mode HS, S1102 is omitted in the reducing power consumption of FIG. 11. That is, in the high speed mode HS, the generating FCS (reducing frequency) (S1103) is performed only when the location information change amount $\Delta LI$ is more than 0.

According to the second embodiment, the VFC 12 controls the power consumption of the target device according to the location information change amount $\Delta LI$, and the first cycle number C1, second cycle number C2 and fourth cycle number C4, which relate to the change of the location information. As a result, the versatility and reusability of the VFC 12 can be improved.

Third Embodiment

A third embodiment will be explained below. In the third embodiment, the DVFS is explained for the plural target devices by way of example. The descriptions of contents similar to those of the first and second embodiments will not be repeated.

In the third embodiment, the adjuster 11 of FIG. 2 simultaneously acts as the slave device having the function of receiving the data D transmitted from the master device and as the master device having the function of transmitting the data D to the slave device.

Figure 16:
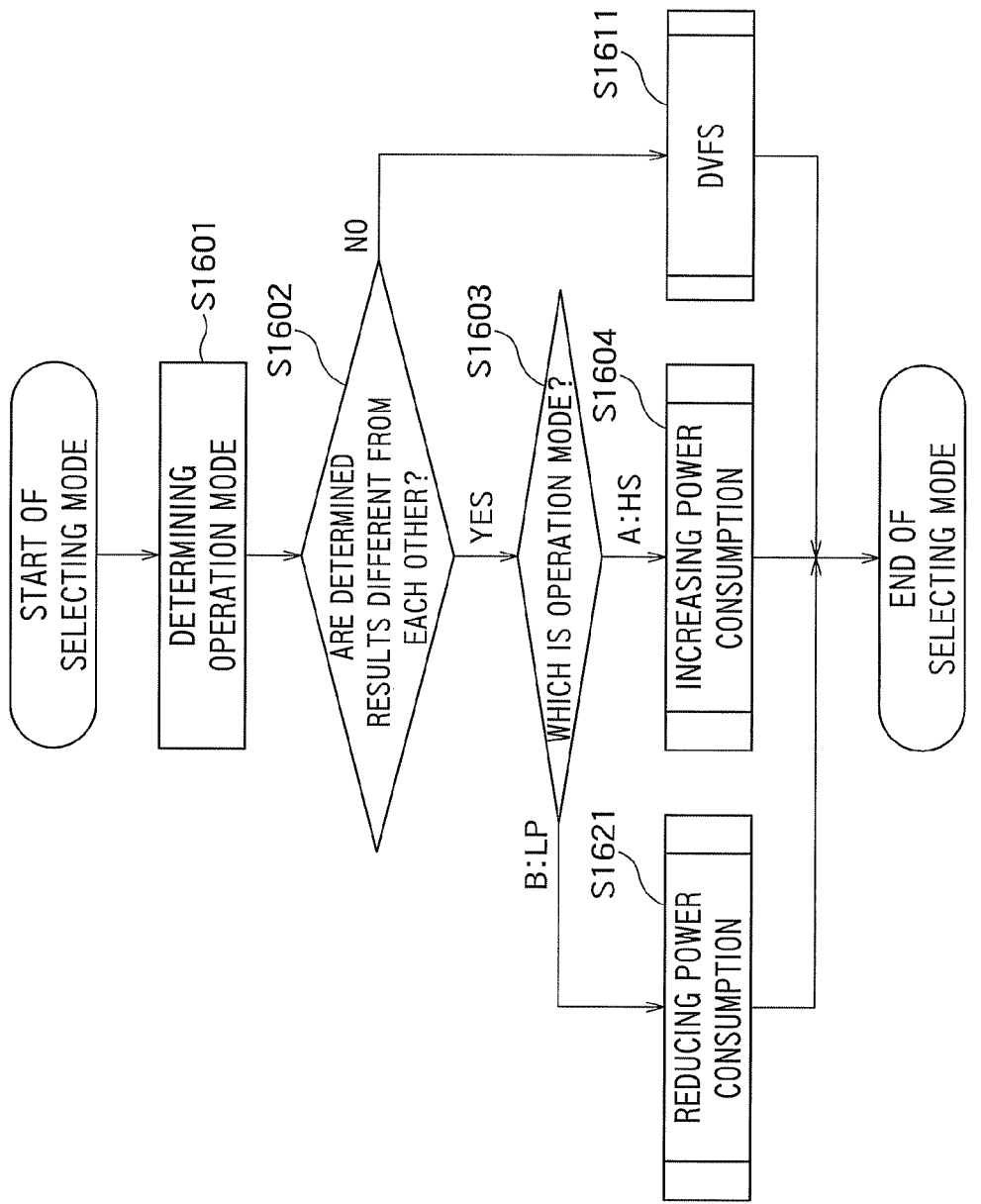
FIG. 16 is a flowchart illustrating a procedure of the selecting mode of the third embodiment.

Selecting mode of the third embodiment will be explained below. FIG. 16 is a flowchart illustrating a procedure of the selecting mode of the third embodiment.

The selecting mode is performed prior to the DVFS of FIG. 3 or FIG. 10.

<Determining operation mode (S1601)> The VFC 12 determines which the increasing power consumption or the reducing power consumption should be performed to each of the master device that is a source of the data D and the slave device that is a destination of the data D. In the determining operation mode (S1601), the VFC 12 acts as an operation mode determining unit. For example, the VFC 12 determines the operation mode of the slave device similarly to S302 of FIG. 3, and determines the operation mode of the master device similarly to S1002 of FIG. 10.

<S1602> The VFC 12 determines whether plural determined results of the determining operation mode (S1601) are different from each other. When the plural determined results are different from each other (YES in S1602), S1603 is performed. When the plural determined results equal to each other (NO in S1602), DVFS (S1611) is performed.

<S1603> The VFC 12 determines which is the operation mode. When the operation mode is the high speed mode HS (A in S1603), the increasing power consumption (S1604) is performed. When the operation mode is the low power consumption mode LP (B in S1603), reducing power consumption (S1621) is performed.

<Increasing power consumption (S1604)> The increasing power consumption (S1604) is similar to that (increasing power consumption (S303) of FIG. 3) of the first embodiment. When the increasing power consumption (S1604) is ended, the selecting mode is ended.

<DVFS (S1611)> For the slave device, the DVFS (S1611) is similar to that of the first embodiment (see FIG. 3). For the master device, the DVFS (S1611) is similar to that of the second embodiment (see FIG. 10). When the DVFS (S1611) is ended, the selecting mode is ended.

<Reducing power consumption (S1621)> For the slave device, the reducing power consumption (S1621) is similar to the reducing power consumption (S311) of FIG. 3 of the first embodiment (see FIG. 5). For the master device, the reducing power consumption (S1621) is similar to the reducing power consumption (S1011) of FIG. 10 of the second embodiment (see FIG. 11). When the reducing power consumption (S1621) is ended, the selecting mode is ended.

According to the third embodiment, in the case of the plural target devices, the VFC 12 of FIG. 2 determines which the increasing power consumption or the reducing power consumption (S1621) should be performed to each of the target devices. When the plural determined results are different from each other, the VFC 12 performs the reducing power consumption (S1621) in setting the low power consumption mode in which the target device is operated in the low power consumption, and the VFC 12 performs the increasing power consumption (S1604) in setting the high speed mode in which the target device is operated at high speed. That is, in the case that the adjuster 11 processes both data D in the transmission channel and in the reception channel, and when the operation mode of the target device (slave device) of the transmission channel is different from that of the target device (master device) of the reception channel, the VFC 12 selects the increasing power consumption (S1604) and the reducing power consumption (S1621) according to the operation mode. As a result, in the case of the plural channels, the versatility and reusability of the VFC 12 can be improved.

Fourth Embodiment

A fourth embodiment will be explained below. In the fourth embodiment, the low power consumption processing is performed when the operating environment of the target device is abnormal. The descriptions of contents similar to those of the first to third embodiments will not be repeated.

Figure 17:
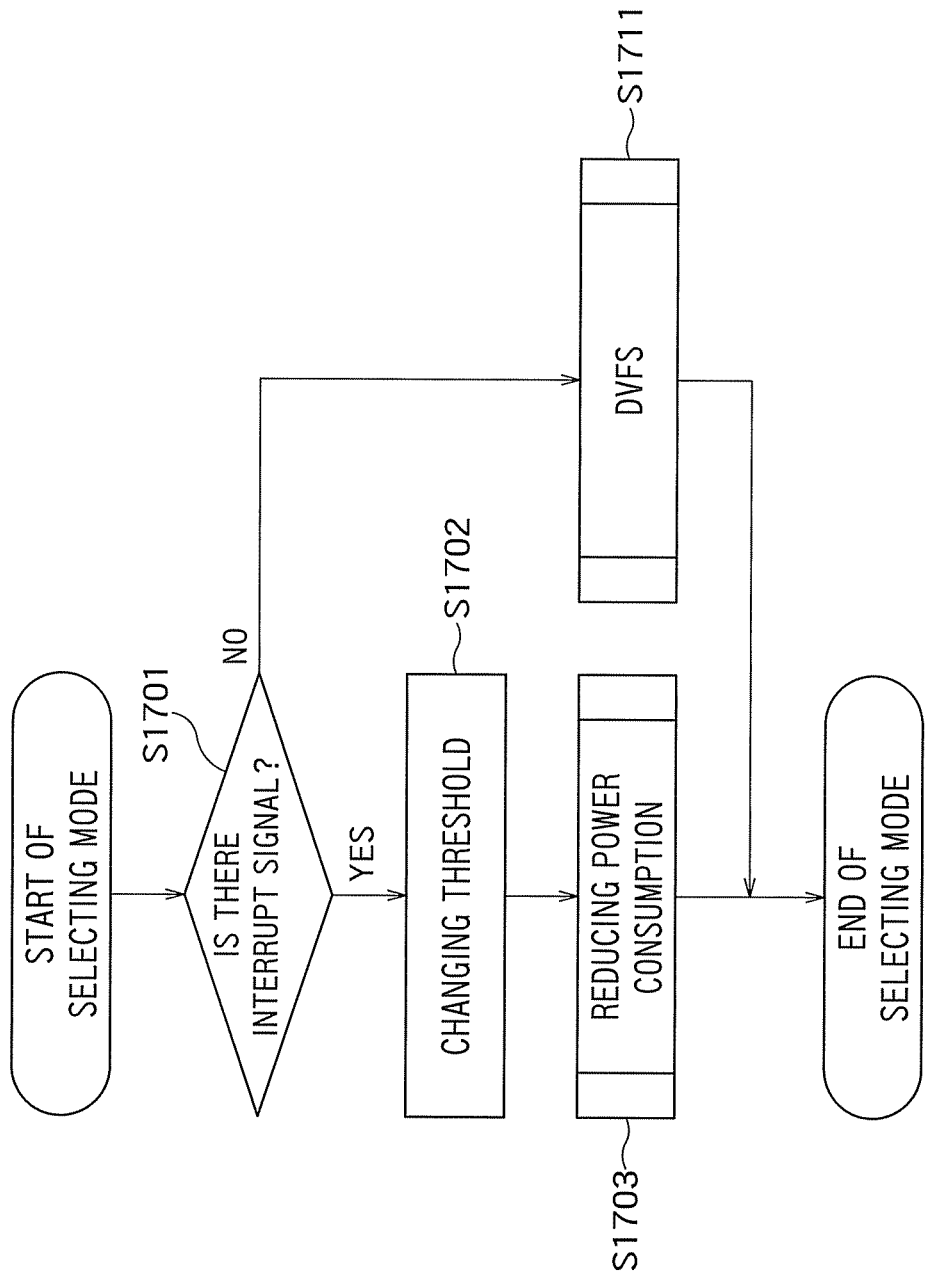
FIG. 17 is a flowchart illustrating a procedure of the selecting mode of the fourth embodiment.

Selecting mode of the fourth embodiment will be explained below. FIG. 17 is a flowchart illustrating a procedure of the selecting mode of the fourth embodiment.

The selecting mode is performed prior to the DVFS of FIG. 3 or FIG. 10.

<S1701> The VFC 12 determines whether there is an interrupt signal IS. When there is the interrupt signal IS (YES in S1701), changing threshold (S1702) is performed. When there is not the interrupt signal IS (NO in S1701), DVFS (S1711) is performed.

<Changing threshold (S1702)> The VFC 12 changes the second threshold TH2 to fourth threshold TH4 to 0. Therefore, the generating FCS (reducing frequency) (S503), the generating VCS (reducing voltage) (S506), the generating FCS (reducing frequency) (S1103), and the generating VCS (reducing voltage) (S1106) can be performed in the reducing power consumption (S1703) irrespective of the values of the second cycle number C2 to fourth cycle number C4.

<Reducing power consumption (S1703)> For the slave device, the reducing power consumption (S1703) is similar to the reducing power consumption (S311) of FIG. 3 of the first embodiment (see FIG. 5). For the master device, the reducing power consumption (S1703) is similar to the reducing power consumption (S1011) of FIG. 10 of the second embodiment (see FIG. 11). When the reducing power consumption (S1703) is ended, the selecting mode is ended.

<DVFS (S1711)> For the slave device, the DVFS (S1711) is similar to that of the first embodiment (see FIG. 3). For the master device, the DVFS (S1711) is similar to that of the second embodiment (see FIG. 10). When the DVFS (S1711) is ended, the selecting mode is ended.

The monitor 13 cancels the interrupt signal IS when the operating environment of the target device becomes normal. Therefore, the DVFS (S1711) can be performed.

According to the fourth embodiment, the VFC 12 of FIG. 2 performs the reducing power consumption (S1703) in order to reduce the power consumption of the target device when the monitor 13 detects that the operating environment of the target device is abnormal. That is, the VFC 12 performs the reducing power consumption (S1703) when the operating environment of the target device is abnormal. As a result, the damage to the target device can be prevented. The damage is caused by increasing power consumption of the target device when the operating environment of the target device is abnormal.

At least a portion of a VFC 12 according to the above-described embodiments may be composed of hardware or software. When at least a portion of the VFC 12 is composed of software, a program for executing at least some functions of the VFC 12 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the VFC 12 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor integrated circuit comprising:
an adjuster configured to adjust transmission and reception of data by temporarily holding the data transmitted and received among a plurality of devices and to output location information on the data; and
a controller configured to perform a first operation to increase power consumption of at least one of target devices and a second operation to reduce the power consumption of at least one of target devices based on a change amount of the location information, wherein
in the first operation,
in a case where the target device whose power consumption is to be controlled is a slave device, when the change amount of the location information is larger than 0 and a time required until the location information changes is smaller than a first threshold, the controller is configured to switch a frequency after increasing voltage of the target device; and in a case where the target device whose power consumption is to be controlled is a master device, when the change amount of the location information is smaller than 0 and the time required until the location information changes is smaller than the first threshold, the controller is configured to switch a frequency after increasing the voltage of the target device, and in the second operation, in a case where the target device whose power consumption is to be controlled is a slave device, the controller is configured to reduce the voltage of the target device when a time during which the location information is not increased is larger than a third threshold after switching the frequency when the change amount of the location information is smaller than 0 or a time during which the location information is maintained is larger than a second threshold; and in a case where the target device whose power consumption is to be controlled is a master device, the controller is configured to reduce the voltage of the target device when a time during which the location information is not reduced is larger than a fourth threshold after switching the frequency when the change amount of the location information is larger than 0 or the time during which the location information is maintained is larger than the second threshold.

2. The circuit of claim 1, wherein in the case of a plurality of target devices, the controller determines an operation mode indicating the first operation or the second operation to be performed, when determined results for the target devices are different from each other, performs the second operation in a low power consumption mode in which the target device is operated at lower power consumption and performs the first operation in a high speed mode in which the target device is operated at higher speed.

3. The circuit of claim 1, wherein in the case of a plurality of target devices, the controller determines an operation mode indicating the first operation or the second operation to be performed, when determined results for the target devices are different from each other, performs the second operation in a low power consumption mode in which the target device is operated at lower power consumption and performs the first operation in a high speed mode in which the target device is operated at higher speed.

4. The circuit of claim 1, further comprising a monitor configured to monitor an operating environment of the target device, wherein the controller performs the second operation when monitored result of the monitor indicates that the operating environment is abnormal.

5. The circuit of claim 1, further comprising a monitor configured to monitor an operating environment of the target device, wherein the controller performs the second operation when monitored result of the monitor indicates that the operating environment is abnormal.

6. An interconnect connectable to a plurality of devices, the interconnect comprising:

an adjuster configured to adjust transmission and reception of data by temporarily holding the data transmitted and received among the devices and to output location information on the data; and a controller configured to perform a first operation to increase power consumption of at least one of target devices and a second operation to reduce the power consumption of at least one of target devices based on a change amount of the location information, wherein in the first operation, in a case where the target device whose power consumption is to be controlled is a slave device, when the change amount of the location information is larger than 0 and a time required until the location information changes is smaller than a first threshold, the controller is configured to switch a frequency after increasing voltage of the target device; and in a case where the target device whose power consumption is to be controlled is a master device, when the change amount of the location information is smaller than 0 and the time required until the location information changes is smaller than the first threshold, the controller is configured to switch a frequency after increasing the voltage of the target device, and in the second operation, in a case where the target device whose power consumption is to be controlled is a slave device, the controller is configured to reduce the voltage of the target device when a time during which the location information is not increased is larger than a third threshold after switching the frequency when the change amount of the location information is smaller than 0 or a time during which the location information is maintained is larger than a second threshold; and in a case where the target device whose power consumption is to be controlled is a master device, the controller is configured to reduce the voltage of the target device when a time during which the location information is not reduced is larger than a fourth threshold after switching the frequency when the change amount of the location information is larger than 0 or the time during which the location information is maintained is larger than the second threshold.

7. The interconnect of claim 6, wherein in the case of a plurality of target devices, the controller determines an operation mode indicating the first operation or the second operation to be performed, when determined results for the target devices are different from each other, performs the second operation in a low power consumption mode in which the target device is operated at lower power consumption and performs the first operation in a high speed mode in which the target device is operated at higher speed.

8. The interconnect of claim 6, wherein in the case of a plurality of target devices, the controller determines an operation mode indicating the first operation or the second operation to be performed, when determined results for the target devices are different from each other, performs the second operation in a low power consumption mode in which the target device is operated at lower power consumption and performs the first operation in a high speed mode in which the target device is operated at higher speed.

9. The interconnect of claim 6, further comprising a monitor configured to monitor an operating environment of the target device, wherein the controller performs the second operation when monitored result of the monitor indicates that the operating environment is abnormal.

10. The interconnect of claim 6, further comprising a monitor configured to monitor an operating environment of the target device, wherein the controller performs the second operation when monitored result of the monitor indicates that the operating environment is abnormal.

11. A non-transitory computer readable medium storing computer program code, the program code comprising:
- adjusting transmission and reception of data by temporarily holding the data transmitted and received among a plurality of devices; and
- performing a first operation to increase power consumption of at least one of target devices and a second operation to reduce the power consumption of at least one of target devices based on a change amount of location information on the data, wherein in the first operation,
- in a case where the target device whose power consumption is to be controlled is a slave device, when the change amount of the location information is larger than 0 and a time required until the location information changes is smaller than a first threshold, a frequency is switched after voltage of the target device is increased; and
- in a case where the target device whose power consumption is to be controlled is a master device, the frequency is switched after the voltage of the target device is increased when the change amount of the location information is smaller than 0 and the time required until the location information changes is smaller than the first threshold, and in the second operation,
- in a case where the target device whose power consumption is to be controlled is a slave device, the voltage is reduced when a time during which the location information is not increased is larger than a third threshold after the frequency is switched when the change amount of the location information is smaller than 0 or a time during which the location information is maintained is larger than a second threshold; and
- in a case where the target device whose power consumption is to be controlled is a master device, the voltage of the target device is reduced when a time during which the location information is not reduced is larger than a fourth threshold after the frequency is switched when the change amount of the location information is larger than 0 or the time during which the location information is maintained is larger than the second threshold.

* * * * *